ELECTRICAL COMMUNICATION SYSTEMS

Inventor Gordon Taylor Dain
by Dennis Steinberg
Attorney

Fig. 2.
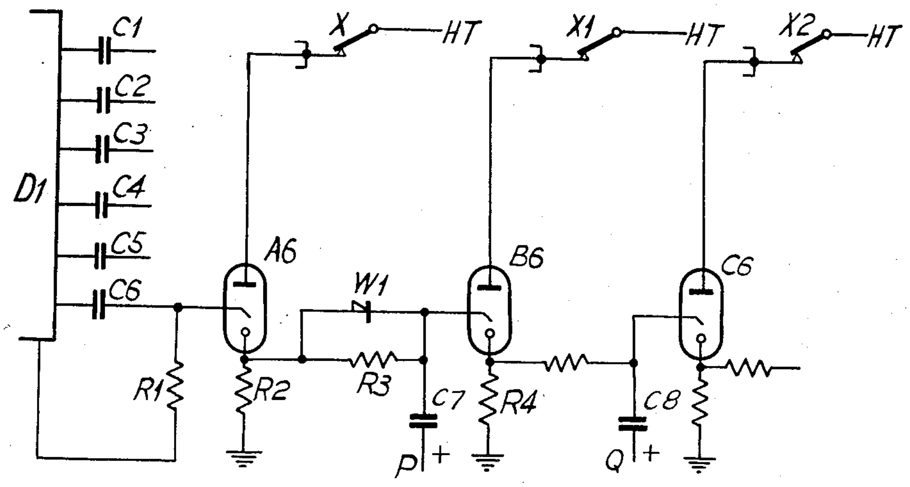
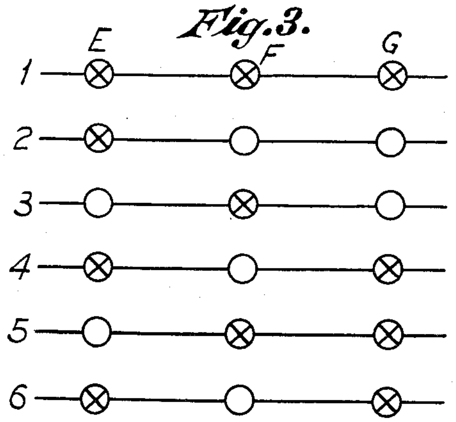
Inventor Gordon Taylor Dain
by Dennie Sleinberg
Attorney Jan. 6, 1959 G. T. DAIN 2,867,684

ELECTRICAL COMMUNICATION SYSTEMS

Filed March 1, 1955 3 Sheets-Sheet 3

Inventor Gordon Taylor Dain by Deane Sheeley

Attorney 2,867,684

ELECTRICAL COMMUNICATION SYSTEMS

Gordon Taylor Dain, Wraysbury, England, assignor to British Telecommunications Research Limited, Taplow, England, a British company Application March 1, 1955, Serial No. 491,397

Claims priority, application Great Britain March 3, 1954

6 Claims. (Cl. 178—2)

The present invention relates to electrical communicating systems employing a code such as the well-known start-stop telegraph code suitable for the operation of teleprinters.

The chief object of the invention is to permit the provision of an improved multi-terminal teleprinter system with arrangements whereby it is possible to encode the destination of a teleprinter signal so that the signal is routed automatically to the desired terminal.

According to the invention in a telegraph switching system employing arrangements for the received characters to be advanced progressively through the different positions of a multi-position storage device each position of which includes a two-position register for each element of the character, in a group of one or more storage positions the registers in addition to being connected to those of the succeeding storage position are also connected to responding equipment arranged to effect specific switching operations if the registers in those storage positions are set to store predetermined characters.

Figure 1:
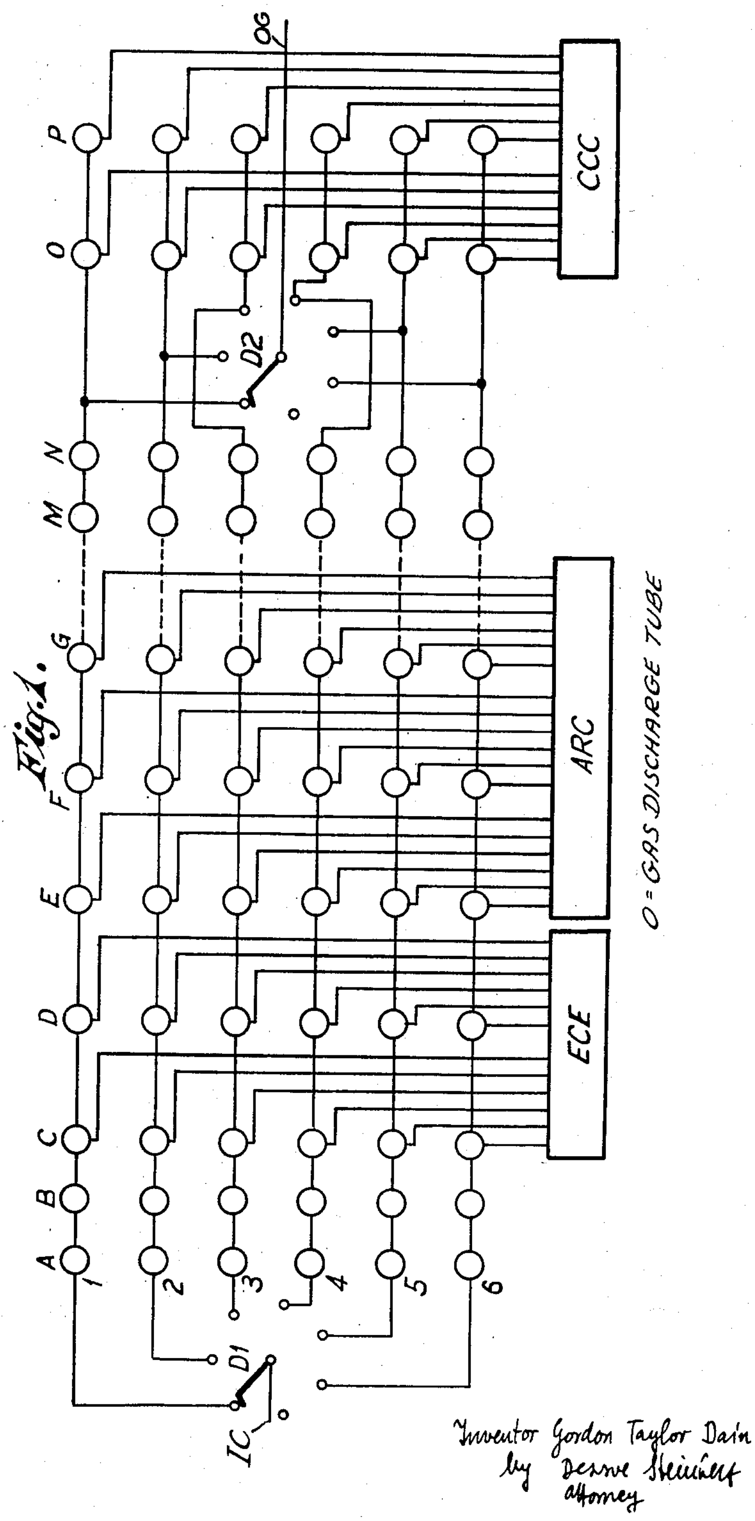
Figure 4:
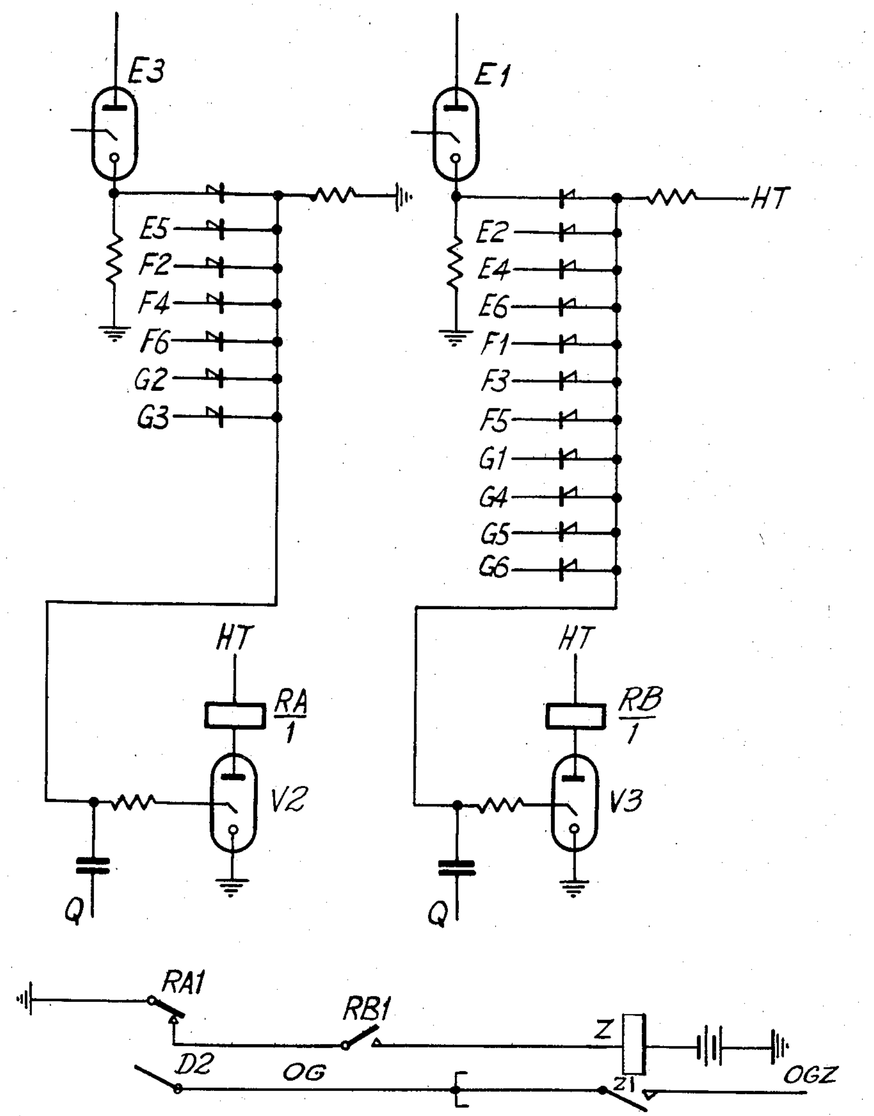

The invention will be better understood from the following description of one method of carrying it into effect which should be taken in conjunction with the accompanying drawings comprising Figs. 1–4. Fig. 1 shows diagrammatically the grouping of the elements of the storage device and the manner in which connections are made to the auxiliary equipment for producing the necessary switching to route the signals to the required destination. Fig. 2 is a circuit diagram showing the relationship between the successive elements of the storage device on the assumption that cold cathode gas discharge tubes are used for this purpose. Fig. 3 shows by way of example a pattern of pulses stored in the three positions of the storage device which are used for controlling automatic routing. Fig. 4 shows in diagrammatic form one example of the discriminating circuit whereby a particular group of characters is enabled to produce a switching operation, for instance to bring about appropriate routing of the connection.

The system about to be described operates on uni-directional circuits only and with automatic transmitters. If the latter are not used there will be so much time lost in manual traffic handling that the main advantage of the whole scheme, namely economy of long distance circuits and operators, is lost. For isolated sub-stations, where the provision of automatic means of transmission is wasteful, it can be arranged that all their information is sent to a suitable centre, which retransmits the information by automatic sending devices for insertion into the system.

The system operates on codes included in the teleprinter message itself. That is, each station connected to the system has its own call sign and any message put into the system for that station must be prefaced by that call sign and also, if desired, a suitable code to initiate switching from that call sign.

A standard 3-character call sign allocated to each station on the system permits $26^3$ stations to be identified, i. e. 17,576 stations. A 2-character call sign permits 676 stations to be identified.

An advantage of using a 3-character call sign is that the first character can indicate a main switching centre to which the station is connected, the second a sub-switching station and the third the actual station on that sub-switching centre. Routing details are facilitated by this means.

The initial parts of the teleprinter message, which represent the coded destination, exist as a pulse train, and the apparatus is arranged to produce a static storage pattern from this pulse train. For this purpose, there is used a number of two-state storage devices such as thermionic valve pairs or magnetic or electromagnetic devices, including relays, but preferably cold cathode triode discharge tubes are used.

With the existing teleprinter code, each character has 7 units, the first and last being the "start" and "stop" respectively and the other five being the intelligence or signal coding elements giving a maximum $2^5$ or 32 separate codes. For the purpose of the invention, it would appear that storage of the 5 intelligence or signal code elements only would be necessary, but in practice the "start" element is also stored, the advantage of this being explained hereinafter.

Six storage devices are therefore required for each character in store, and as many characters as are desired may be stored in the system, so that if $n$ characters are stored, there will be $6n$ storage devices.

When the requisite number of characters have been stored, the switching system can be brought into operation; switching can be initiated either by a special character or code included in the message after the coded destination, or as soon as a requisite number of characters have been received.

As may be gathered from Fig. 1, the storage tubes are arranged in groups, the individual storage elements being indicated by the circles. For each character there are six such elements corresponding to the start element and the five intelligence elements and it is assumed that 14 groups are normally employed designated, A, B, C . . . N which, for reasons which will appear, permits a maximum of 13 characters to be stored at any one time. Auxiliary groups O and P are also provided the purpose of which will be apparent as the description proceeds.

Normally teleprinter signals are supplied over the incoming line IC to the incoming distributor D1 which distributes the individual elements of the character to the storage units A1–A6 inclusive, A1 storing the start element and A2–A6 storing the five signalling elements respectively. Such distributors, which are either mechanically or electronically operated, are well-known in the art and it will be understood that the showing of the distributor D1 in Fig. 1 is diagrammatic only.

As soon as the whole of the six character elements mentioned above have been stored by A1—A6, they are immediately transferred to units B1—B6 respectively so that the A group may be released to store the next incoming character. This transference will take place at any suitable time during the stop element of the character which has just been stored on the A group.

At the other end of the storage device a distributor D2 is provided for associating the individual tubes of a group in turn with the outgoing line OG. This distributor is of the start-stop type, that is to say it is not operating continuously during the transmission of a message but it performs a single cycle to transmit one character and is then arrested for a longer or shorter time. This distributor also may be either mechanically or electronically operated and both types are well-known in the art.

The operation of distributor D2 is controlled from distributor D1 in that as long as D1 is operating, during the signal code and stop elements D1 controls D2 so that D2 will only complete the cycle for the character being sent out but will not start another cycle until it has been released by D1. Distributor D1 may be adjusted to work at any standard speed of transmission but for the method of operation described to be possible, the cycle time of D2 must be somewhat less than that of D1 in view of the periods during which D2 is arrested.

At the start of each cycle of distributor D2, a pulse is applied to all the storage groups B to N inclusive which has the effect of transferring the intelligence stored on any group to the next. At the incoming end of the storage device, this will have the effect of rendering the B group free to receive a further character from the A group while at the other end of the storage device, the character stored in group N will be removed since it has already been transmitted and is therefore no longer required. This is subject to what is said subsequently regarding the operation of the groups O and P.

Consider, for example, a character being received by distributor D1 and being stored on group A. At the theoretical mid-point of the start element of the code, a space condition will be given to unit A1. At the theoretical mid-point times of the five signal code elements, units A2—A6 will be set according to the polarity of signal code elements 1–5 respectively, which, for example, in the case of letter shift will be all mark polarity. During reception of the stop element of the incoming character, the conditions stored up on A1—A6 are transferred to B1—B6 respectively, and the former are released to store the next incoming character.

As distributor D2 is set to have a cycle time less than the incoming distributor D1, there will be a time between two successive stop elements of incoming characters when D2 will start a new cycle of operations. Under conditions of automatic transmissions, this will generally coincide with the end of the stop element of an incoming character as the start of a D2 cycle is arrested during the reception of the signal code and stop elements. Thus, before the next character is transferred in store from A group to B group, the preceding character will have been transferred from B group to C group by pulses which, as mentioned above, transfer all characters stored on groups B—N to the next group at the start of a new cycle of D2.

Group N units are connected to the elements of distributor D2 so that any character stored on group N after the start of a cycle of D2 is transformed to the standard line code and sent to line before it is cleared from group N by the start of the next cycle. The groups A—N thus introduce a delay in messages being received by D1 and retransmitted by D2.

It will now be appreciated that if the start signal were not stored as well as the code elements, the distributor D2 would be likely to run continuously in the absence of any message causing the operation of distributor D1.

It is a known fact that, providing the power supplies are adjusted correctly, a cold cathode triode can be rendered conducting over its main gap by a positive pulse on its trigger electrode or a negative pulse on its cathode. Moreover, the main gap will remain conducting after this pulse has disappeared until such time as the main anode-cathode circuit is broken or the voltage across the main gap reduced below its normal burning value.

Fig. 2 shows the circuit arrangement for one of the storage units, specifically the 6th in the groups A, B and C. The incoming distributor D1 is arranged so that positive pulses are fed out through capacitors C1—C6 at times corresponding to the mid-points of the start and 5 signal code elements respectively of an incoming signal to D1. Only one pulse is applied to each output in any one character, that applied through C1 being the pulse at the mid-point of the start element, that through C2 being the pulse at the mid-point of the first signal code element, and so on up to that through C6, which is the pulse coinciding with the mid-point of the fifth signal code element. These six pulses are gated either in the distributor or in the individual connections to A1 to A6 so that they are suppressed or rendered inoperative when a mark condition exists on the incoming line. Gating can be arranged to suppress space and not mark pulses equally well, if necessary, but the following description is based on the suppression of mark pulses, as this method economises somewhat in current.

As soon as the sixth pulse has reached or been suppressed from the sixth storage element A6, the code of the incoming character is stored on the A group, a space condition of any element being represented by the cold cathode triode burning while the mark condition will be represented by the respective cold cathode tube being extinguished. Thus, each cathode resistor R2 associated with a space storage will have a positive potential on its cathode terminal while those associated with mark storage will have zero potential. Resistor R1 is the grid resistor for tube A6 by way of which a suitable priming potential is applied.

Immediately after the storage of a character on group A, the whole pattern is transferred to group B. The potential across resistor R2 is fed through rectifier W1 shunted by resistor R3 to the trigger electrode of tube B6. At the time of transfer there is no storage on the tubes of group B since the previous character has by now been transferred to group C on the start of a cycle of distributor D2 as described above.

The contacts X represent diagrammatically the switching means for removing the anode supply from the tubes of group A and this is done momentarily at the same instant as a positive pulse is applied over lead P. This switching operation is preferably performed electronically rather than by the contacts of a relay as the drawing suggests. The effect of the removal of the anode voltage is to extinguish all the units A1—A6 which are lighted. Immediately before this happens however since A6 is conducting, there is positive potential on the cathode of this tube due to the voltage drop across resistor R2. The effect of this is to provide a priming voltage on the trigger electrode of tube B6 by way of rectifier W1 and resistor R3 and this voltage does not immediately disappear when the anode circuits are opened at contacts X. The pulse P is insufficient by itself to strike the tube B6 but this effect will be produced if a priming voltage is supplied from A6. Accordingly when the P pulse is supplied, the tubes in the B group corresponding to those lighted in the A group are struck and the A tubes are then extinguished.

Rectifier W1 is included in this circuit so that capacitor C7 may be charged rapidly from the voltage developed across resistor R2 if the tube A6 is struck, since as A6 is the last tube to be dealt with by the distributor D1, the time between its striking and the transfer of the stored character to the B group may be as little as 10 milliseconds. In the subsequent transfer circuits between groups B and C and so on up to N, the time between the striking of a storage tube and the transfer of its information to the next group will be equal to the spacing of the incoming characters generally of the order of 150 milliseconds so that it is not necessary to provide a rectifier and this will be apparent from Fig. 2 in the connections of tubes B6 and C6. It will be appreciated that conditions are correspondingly successively less onerous for the lower numbered tubes of the A group but it may still be desirable to provide rectifiers in every case to ensure reliable operation of this circuit.

Transfer from group B to group C takes place in a similar manner apart from the differences already mentioned except that the pulse Q which determines the instant of transfer is controlled from the distributor D2 and will occur at a different time from the pulse P. The same pulse Q however controls transfer as regards all the subsequent groups since it is essential that these transfers shall take place simultaneously. The contacts X1 and X2 and similar contacts in the anodes of the other tubes of the groups B—N are also all operated at the same instant as the pulse Q and this will not be the instant of operation of the contacts X.

The above description indicates how each individual incoming character is stored and then transferred step-by-step along the groups of storage units until it is finally retransmitted by the outgoing distributor D2. As already pointed out, since the distributor D2 is arrested for a certain period during each incoming character, the rate of transmission of characters from D2 will be the same as that of reception at D1 under automatic signalling conditions and D2 will only start running continuously after reception is completed at D1. Thus during reception of any message the successive characters received by D1 will be stored on successive groups during their passage down the storage chain. This method of operation facilitates the provision of the automatic routing feature.

As shown in Fig. 1, groups E, F and G are connected to the automatic routing control equipment ARC, the circuit arrangements of which will be apparent from Fig. 4. The choice of groups E, F and G is arbitrary as the only essential requirement is that the necessary switching operation to route the message to its appropriate destination shall be effected before the subsequent message in passing down the storage chain reaches the distributor D2. It may be necessary that the routing code also should be sent over the selected circuit in order to produce switching at one or more subsequent points.

Fig. 3 indicates a code which may be used to initiate a particular switching operation and it will be understood that the crossed circles represent the units in their space condition, i. e. lighted, while the plain circles represent units in the mark or extinguished condition.

In order that the particular code may be detected and produce the required switching operation, use is made of a grouping of rectifiers sometimes referred to as a gate or coincidence circuit. It has already been pointed out that if any tube of the storage device is lighted, its cathode will be at positive potential while if the tube is extinguished the cathode will be at earth potential. If a connection is made by way of a suitably poled rectifier from the cathode of each of a plurality of tubes to a common point connected to earth by way of a resistor, the common point will remain at earth potential if all the tubes are extinguished but will be positive if any one or more of the tubes are lighted. Similarly if rectifiers poled in the opposite directions from those just mentioned are connected between the cathode of a number of tubes and a common point which is connected by way of a resistor to positive, the common point will remain positive if all the tubes are lighted but will remain at substantially earth potential if any one or more of the tubes are extinguished. This is subject to the proviso that the impedance of any cathode circuit is low compared to the total impedance connected to it and that the combined backward resistance of all the rectifiers connected to any one point is high compared with the forward resistance of one rectifier.

It will be seen that the code indicated by way of example in Fig. 3 involves the striking of tubes E1, E2, E4, E6, F1, F3, F5, G1, G4, G5 and G6. Consequently these eleven tubes are connected together in the manner above suggested as indicated on the right-hand side of Fig. 4 where only tube E1 is actually shown. Similarly on the left-hand side of Fig. 4, tubes E3, E5, F2, F4, F6, G2 and G3 are coupled together to form a coincidence circuit operating in the reverse manner. Accordingly at the instant when this particular code is stored in groups E, F and G, there will be no potential applied to the trigger electrode of tube V2 to serve as a priming voltage but there will be such a priming potential applied to the trigger electrode of tube V3. Consequently when a pulse is applied to lead Q, tube V2 will not be able to strike so that relay RA is not operated but tube V3 will strike and will operate the relay RB in its anode circuit. As a consequence a circuit is completed for relay Z to produce the initial switching operation to route the message towards its required destination, for instance by connecting the outgoing line OG over contacts Z1 to the line OGZ extending in the desired direction. It will be appreciated that no other code can produce this particular switching operation and hence satisfactory discrimination is obtained.

It is quite possible that the message subsequently transmitted might include a group of characters identical with the code which produced the necessary switching operation and this might produce undesirable results if it tended to bring about the switching operation indicated in Fig. 4. In order to ensure that this shall not happen, equipment such as ECE, Fig. 1, may be provided which is responsive to a particular enabling code which is transmitted adjacent to the switching code. As shown in Fig. 1, the responding equipment for this code is connected to the C and D groups of tubes but the actual choice of the group in the register is not of fundamental importance provided the enabling code can exercise its effect before the switching code becomes operative on the E, F, and G groups of tubes. The position then is that unless the enabling code occurs in the right positions, the route switching code will not produce a switching effect and this very considerably reduces the chance of false switching, particularly if the codes are specially selected to comprise groups of characters which are unlikely to occur in juxtaposition during the sending of an ordinary message. It will be understood that the equipment ECE comprises coincidence circuits similar to those in the equipment ARC as disclosed in greater detail in Fig. 4.

The invention may also be employed to produce an automatic cleaning signal and for this purpose the appropriate number of additional groups of storage tubes are provided beyond the distributor D2. This is necessary to ensure that the whole of the message shall be transmitted before the clearing operation takes place. In Fig. 1 of the drawing additional groups O and P are indicated which are connected by way of suitable coincidence circuits to the equipment CCC to produce a clearing signal.

As already mentioned, the use of a group of three characters for effecting route switching offers certain advantages, particularly when the network is arranged in the form of stations, sub-switching and main switching centres, each main centre being connected to all other main centres and each sub-switching centre being responsible for its group of stations and being connected to a main switching centre. In this case the first character of a three-character code could be allocated to the main switching centre, the second character allocated to the sub-switching centre and the third allocated to the required station. Thus the code BDG should represent the 7th station on the 4th sub-switching centre of the main centre B.

Using this technique, only the first code character need be used for routing between main centres, only the second character used for switching from the main centre to the requisite sub-switching centre and only the third character used for switching between a sub-switching centre and the stations accessible therefrom. This would mean that only one character would be needed to arrange switching at any point in the system but obviously the remaining characters would need to be transmitted over as many switching circuits as were concerned until the connection had been set up to the desired station. In these circumstances since only one character produces switching at any one point, it is essential to take steps to prevent the same character occuring in the subsequent mesage from upsetting the switching operation.

I claim:

1. In a telegraph switching system employing a start-stop telegraph code, an incoming line, a storage device comprising a plurality of sets of registers, each set including an individual two-position register for each element of a character, first distributing means for distributing signal elements received over said incoming line to the first set of individual registers, means for transferring the setting of said first set of registers to said second set on the completion of said character, an outgoing line, second distributing means for scanning the final set of registers in order to associate the individual registers successively with the outgoing line, means under the control of said second distributing means for simultaneously transferring the information in each set of registers except the first to the succeeding set, and switching means associated with a plurality of sets of registers and operable to effect a route switching operation under the joint control of said plurality of sets of registers responsive to predetermined settings thereof.

2. In a telegraph switching system employing a start-stop telegraph code, an incoming line, a storage device comprising a plurality of sets of registers, each set including an individual two-position register for each element of a character, first distributing means for distributing signal elements received over said incoming line to the first set of registers, transfer means for causing the characters stored on any set of registers to be transferred to the succeeding set, an outgoing line, second distributing means for scanning the final set of registers in order to associate the individual registers of a set successively with said outgoing line, a plurality of sets of auxiliary registers forming a continuation of said storage device whereby the character stored in said final set of registers is transferred to the first set of auxiliary registers after scanning by said second distributing means, and switching means associated with said plurality of sets of auxiliary registers and operable to effect a clearing operation under the joint control of said sets of auxiliary registers responsive to predetermined settings thereof.

3. In a telegraph switching system employing a start-stop telegraph code, an incoming line, a storage register comprising a plurality of sets of cold cathode tubes, each set including a tube for each element of a character, first distributing means for distributing signal elements arriving over said incoming line to the first set of tubes, means for transferring all the stored characters from one set of tubes to the next successively through the register, second distributing means for scanning the final set of tubes in order to transfer to the outgoing line the successive elements of the character stored thereon, and switching means associated with a plurality of sets of tubes and operable to effect a route switching operation under the joint control of said plurality of sets of tubes responsive to predetermined characters stored thereon.

4. A telegraph switching system as claimed in claim 3 in which potentials derived from predetermined tubes in each of said plurality of sets are applied by way of a coincidence circuit to effect the operation of a first relay if all said tubes are operated and potentials derived from all the remaining tubes of said plurality of sets are applied by way of a coincidence circuit to prevent the operation of a second relay if none of said remaining tubes are operated, the switching operation only being effected if said first relay is operated and said second relay is not operated.

5. A telegraph switching system as claimed in claim 3 in which the cathode of each tube of a set is connected to the trigger electrode of the corresponding tube of the succeeding set and transfer from one set of tubes to the next is effected by momentarily interrupting the anode circuits of the tubes and simultaneously applying a pulse to the trigger electrodes, the pulse being of insufficient amplitude to strike the tube in the absence of the priming voltage due to the lighted condition of the tube in the preceding set.

6. A telegraph switching system as claimed in claim 5 in which the priming voltage from the cathode of each tube of the first set is fed to the trigger electrode of the corresponding tube of the second set by way of a resistor shunted by a rectifier in the conducting direction.

References Cited in the file of this patent

UNITED STATES PATENTS

| | | |
|---|---|---|
| 2,123,459 | Anderson | July 12, 1938 |
| 2,216,610 | Culbertson | Oct. 1, 1940 |
| 2,248,820 | Haselton | July 8, 1941 |
| 2,570,279 | Ridler | Oct. 9, 1951 |
| 2,625,601 | Halvorsen | Jan. 13, 1953 |
| 2,649,502 | Odell | Aug. 18, 1953 |
| 2,700,502 | Hamilton | Jan. 25, 1955 |